(12) United States Patent
Yoshida et al.

(10) Patent No.: US 10,673,310 B2
(45) Date of Patent: Jun. 2, 2020

(54) STATOR MANUFACTURING METHOD AND APPARATUS

(71) Applicant: HONDA MOTOR CO., LTD., Tokyo (JP)

(72) Inventors: Takashi Yoshida, Tochigi-ken (JP); Daiki Sakai, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 15/656,157

(22) Filed: Jul. 21, 2017

(65) Prior Publication Data

US 2018/0026503 A1 Jan. 25, 2018

(30) Foreign Application Priority Data

Jul. 25, 2016 (JP) .................................. 2016-145066

(51) Int. Cl.
*H02K 15/04* (2006.01)
*H02K 15/08* (2006.01)

(52) U.S. Cl.
CPC .............................. *H02K 15/0428* (2013.01)

(58) Field of Classification Search
CPC ............. H02K 15/0428; H02K 15/04; H02K 15/0414; H02K 15/00; H02K 15/08; Y10T 29/49009; Y10T 29/49071; Y10T 29/49073
USPC ........................................ 29/605, 592, 606
See application file for complete search history.

(56) References Cited

U.S. PATENT DOCUMENTS

| | | | | |
|---|---|---|---|---|
| 3,641,648 A | * | 2/1972 | Kalberman | ....... H01L 21/67144 228/6.2 |
| 3,834,014 A | * | 9/1974 | Burr | ....... H01R 43/08 29/598 |
| 4,160,926 A | * | 7/1979 | Cope | ....... H02K 3/345 174/110 N |
| 4,424,939 A | * | 1/1984 | Ohashi | ....... H01F 41/08 242/434.8 |
| 4,449,293 A | * | 5/1984 | Itoh | ....... H02K 15/0435 140/92.1 |
| 4,491,281 A | * | 1/1985 | Dosaka | ....... H01F 41/08 242/434.8 |
| 5,118,153 A | * | 6/1992 | Allison | ....... H05K 13/0447 294/131 |
| 5,778,512 A | * | 7/1998 | Ichikawa | ....... H02K 15/0414 29/598 |
| 6,055,720 A | * | 5/2000 | Finn | ....... H01F 41/082 242/118.4 |

(Continued)

FOREIGN PATENT DOCUMENTS

JP 3589134 8/2004

*Primary Examiner* — Peter Dungba Vo
*Assistant Examiner* — Kaying Kue
(74) *Attorney, Agent, or Firm* — Rankin, Hill & Clark LLP (57) ABSTRACT

A stator manufacturing apparatus is equipped with spindles as twisting and bending jigs, an inner guide having a first supply flow path and a suction flow path formed in the interior thereof, and an outer guide having a second supply flow path formed in the interior thereof. Further, the spindles have receiving members in which insertion recesses are formed. Through holes are formed in the receiving members, and the receiving members are formed with lateral holes therein which allow the interiors of the insertion recesses to communicate with each other.

10 Claims, 5 Drawing Sheets

(56) References Cited

U.S. PATENT DOCUMENTS

| | | | |
|---|---|---|---|
| 6,192,574 B1* | 2/2001 | Wargren | H01F 41/06 279/3 |
| 6,425,175 B1* | 7/2002 | Sawada | H02K 15/0414 29/564.1 |
| 7,084,541 B2* | 8/2006 | Gorohata | H02K 3/505 310/180 |
| 8,760,029 B2* | 6/2014 | Nagashima | H02K 1/145 310/156.66 |
| 2001/0007169 A1 | 7/2001 | Takahashi et al. | |
| 2003/0132679 A1* | 7/2003 | Kato | H02K 15/0037 310/179 |
| 2003/0167624 A1* | 9/2003 | Fortuna | H02K 15/0043 29/596 |
| 2003/0233748 A1* | 12/2003 | Gorohata | H02K 3/505 29/596 |
| 2004/0172805 A1* | 9/2004 | Tokizawa | H02K 15/0037 29/596 |
| 2005/0081365 A1* | 4/2005 | Gorohata | H02K 15/0428 29/596 |
| 2005/0214151 A1* | 9/2005 | Okaichi | F01C 21/0809 418/125 |
| 2008/0036318 A1* | 2/2008 | Lee | H02K 15/02 310/89 |
| 2010/0077599 A1* | 4/2010 | Tokizawa | H02K 15/0478 29/596 |
| 2011/0099797 A1* | 5/2011 | Mishina | H02K 15/067 29/596 |
| 2011/0273033 A1* | 11/2011 | Nagashima | H02K 1/145 310/44 |
| 2012/0017425 A1* | 1/2012 | Endo | H02K 15/14 29/596 |
| 2012/0200190 A1* | 8/2012 | Matsuoka | H02K 3/12 310/179 |
| 2013/0214634 A1* | 8/2013 | Hasegawa | H02K 3/12 310/194 |
| 2014/0132096 A1* | 5/2014 | Takeda | H02K 3/50 310/71 |
| 2014/0201979 A1* | 7/2014 | Yamaguchi | H02K 15/066 29/596 |
| 2014/0225465 A1* | 8/2014 | Goto | B23K 9/167 29/596 |
| 2015/0059164 A1* | 3/2015 | Onda | H02K 15/0087 29/596 |
| 2015/0180319 A1* | 6/2015 | Kimura | H02K 15/0087 29/596 |

* cited by examiner

STATOR MANUFACTURING METHOD AND APPARATUS

CROSS-REFERENCE TO RELATED APPLICATION

This application is based upon and claims the benefit of priority from Japanese Patent Application No. 2016-145066 filed on Jul. 25, 2016, the contents of which are incorporated herein by reference.

BACKGROUND OF THE INVENTION

Field of the Invention

The present invention relates to a method and apparatus for manufacturing a stator by twisting and bending coil segments.

Description of the Related Art

A stator is known in which each of coil segments (hereinafter simply referred to as "segments") is inserted into two out of a plurality of slots formed along the circumferential direction of an annular stator core. In this instance, each of the segments includes a first straight portion, a second straight portion extending in parallel and face-to-face with the first straight portion, and a turn portion which is bent and continues from the first straight portion to the second straight portion, and for this reason, each of the segments exhibits a substantially U-shaped form. Since the plurality of slots are formed in a radiating manner, for example, the first straight portions face toward an inner circumferential side of the stator core, and the second straight portions face toward an outer circumferential side thereof.

Ends of the first straight portion and the second straight portion protrude from the slots. The protruding parts are twisted and bent in a parallel state. In Japanese Patent No. 3589134, there is proposed a stator coil twisting device for carrying out such twisting and bending. The stator coil twisting device includes a plurality of individual annular twisting and bending jigs which are capable of being rotated. An insertion recess is formed in each of the jigs, and the first straight portion and the second straight portion are inserted into mutually different insertion recesses. In this state, the twisting and bending jigs are rotated, and as a result, the segment is twisted.

Thereafter, the ends of the first straight portion and the second straight portion, which protrude from the slots, are joined by an appropriate method such as TIG welding or the like to ends of the first straight portion and the second straight portion of another segment, which has been twisted and bent in the same manner as described above. By being joined in this manner, an electrical pathway is formed between the segments. Moreover, portions of such segments other than the ends of the first straight portion and the second straight portion are covered in advance with an insulative coating.

SUMMARY OF THE INVENTION

It may be assumed that when the end of the first straight portion or the second straight portion is inserted into the insertion recess, the leading edge part of the end tends to interfere with a location in the vicinity of opening of the insertion recess. In the case of such an occurrence, there is a concern that fragments, which occur due to chipping of the leading edge part, may enter inside the insertion recesses or between adjacent ones of the twisting and bending jigs. In the case that such fragments, which remain inside the insertion recesses, become adhered to the segments to be twisted and bent thereafter, the fragments may become sandwiched between the segments when the aforementioned twisting and bonding steps are carried out. In this case, conduction will occur at locations that should be insulated.

A principal object of the present invention is to provide a method of manufacturing a stator, which is capable of maintaining insulation at locations of segments that should be insulated.

Another object of the present invention is to provide a stator manufacturing apparatus for implementing the aforementioned manufacturing method.

According to an embodiment of the present invention, a stator manufacturing method is provided for obtaining a stator by twisting and bending coil segments in which first straight portions and second straight portions of the coil segments are inserted into slots formed along a circumferential direction of a stator core, including the steps of:

inserting ends of the first straight portions or the second straight portions, which are exposed from the slots, into insertion recesses formed respectively in a plurality of twisting and bending jigs, and thereafter, twisting and bending the coil segments by rotating the twisting and bending jigs; and separating the ends of the first straight portions or the second straight portions away from the insertion recesses, and thereafter, simultaneously suctioning interiors of all of the insertion recesses.

According to another embodiment of the present invention, a stator manufacturing apparatus is provided, which is configured to obtain a stator by twisting and bending coil segments in which first straight portions and second straight portions of the coil segments are inserted into slots formed along a circumferential direction of a stator core, including:

a plurality of twisting and bending jigs configured to be rotated, and having receiving members in which insertion recesses are formed, ends of the first straight portions or the second straight portions, which are exposed from the slots, being inserted into the insertion recesses; and a suction unit configured to suction the interiors of the insertion recesses;

wherein the receiving members of the twisting and bending jigs are arranged concentrically, and the suction unit is configured to simultaneously suction the interiors of all of the insertion recesses.

In this manner, in the present invention, after the coil segments have been twisted and bent, the interiors of the insertion recesses, in which the first straight portions and the second straight portions of the coil segments were inserted, are suctioned. At the time that the first straight portions and the second straight portions are inserted into the insertion recesses, chipping of the first straight portions or the second straight portions may take place, thereby leading to the occurrence of fragments, and if such fragments remain in the insertion recesses, the fragments are led out from the insertion recesses by such suctioning.

When handled in this manner, since the fragments are discharged from the insertion recesses, thereafter, when other coil segments are subsequently twisted and bent, the adherence of such fragments to the coil segments is avoided. Therefore, formation of electrical pathways between the segments due to the fragments, or stated otherwise, the occurrence of conduction at locations that should be insulated can be avoided.

In order to carry out suction thereof, the insertion recesses may be covered with a suction tube which is connected to the suction unit. Alternatively, an inner guide may be arranged inwardly of an innermost one of the twisting and bending jigs, and an outer guide may be arranged outwardly of an outermost one of the twisting and bending jigs. Additionally, a suction flow path may be formed in either one of the inner guide and the outer guide. In this case, communication holes may be formed on respective side walls of the receiving members of the twisting and bending jigs in order to allow the insertion recesses to communicate with the suction flow path.

In the case that such a suction flow path is formed in the inner guide or the outer guide, the aforementioned suction tube becomes unnecessary. Accordingly, an advantage is obtained in that the configuration of the stator manufacturing apparatus is simplified.

When the interiors of the insertion recesses are suctioned, a fluid medium may be supplied to the insertion recesses from a direction that differs from a direction in which suctioning is performed. For doing so, a supply flow path that communicates with the insertion recesses may be formed in either one of the inner guide and the outer guide, and the fluid medium may be supplied to the insertion recesses via the supply flow path, from a direction that differs from a direction in which suctioning is performed.

In this case, a pulling force due to suction and a pressing force due to the fluid medium both act on the fragments that remain in the insertion recesses. Since the direction in which the pulling force acts and the direction in which the pressing force acts differ from each other, owing to the combined forces, the fragments are more easily suctioned. Consequently, it is easier to remove the fragments from the insertion recesses.

Further, when the coil segments are twisted and bent, a fluid medium may be supplied between adjacent ones of the twisting and bending jigs. The supply source for such a fluid medium may be different from the supply source that supplies the fluid medium to the insertion recesses, but in order to simplify the configuration, preferably the same supply source is used.

It is assumed that fragments and other foreign matter may enter and intrude between adjacent ones of the twisting and bending jigs. Therefore, the fluid medium is supplied between the adjacent twisting and bending jigs. By receiving the pressing force from the fluid medium, it is difficult for such fragments and foreign matter to enter between the twisting and bending jigs. More specifically, it is possible to prevent the fragments from biting in between the twisting and bending jigs. As a result, any hindrance to rotation of the twisting and bending jigs can be avoided.

Moreover, for supplying the fluid medium between adjacent ones of the twisting and bending jigs, through holes, to which a fluid medium supply unit is connected, may be formed in the receiving members.

Further, a raising and lowering unit configured to raise or lower the outer guide relatively with respect to the inner guide preferably is provided on the outer guide or the inner guide. By being raised and lowered in this manner, for example, the supply flow path can be set at the position of the through hole, or alternatively, at the position of the communication holes. Therefore, since there is no need to form a plurality of supply flow paths in the outer guide or the inner guide, the configuration of the stator manufacturing apparatus is simplified.

Furthermore, preferably a shutter is provided, such that when the coil segments are twisted and bent, the insertion recesses are covered by the shutter. In this case, when suctioning is carried out, atmospheric air is prevented from being suctioned from insertion openings (openings) of the insertion recesses into which the first straight portions or the second straight portions are inserted. Consequently, the efficiency at which suctioning is carried out from the insertion recesses is enhanced.

According to the present invention, the stator manufacturing apparatus is configured to include the suction unit, and after the coil segments have been twisted and bent, the interiors of the insertion recesses, in which the first straight portions and the second straight portions of the coil segments were inserted, are suctioned. Even if fragments occur due to chipping when the first straight portions or the second straight portions are inserted, such fragments are removed by such suctioning from the insertion recesses.

Consequently, thereafter, when other coil segments are subsequently twisted and bent, the adherence of such fragments to the coil segments is avoided. Therefore, in the coils segments, the occurrence of electrical pathways caused by such fragments can be avoided. Stated otherwise, it is possible to maintain insulation at locations of the coil segments that should be insulated.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a stator manufacturing method according to the present invention will be described in detail below with reference to the accompanying drawings, in relation to a stator manufacturing apparatus for implementing such a method. In the following description, the coil segments will be referred to simply as "segments". Further, diameters in the term "diametrical direction" refer to the diameters of concentric circles, which serve as locations where first through fourth receiving members, to be described later, are arranged.

Figure 1:
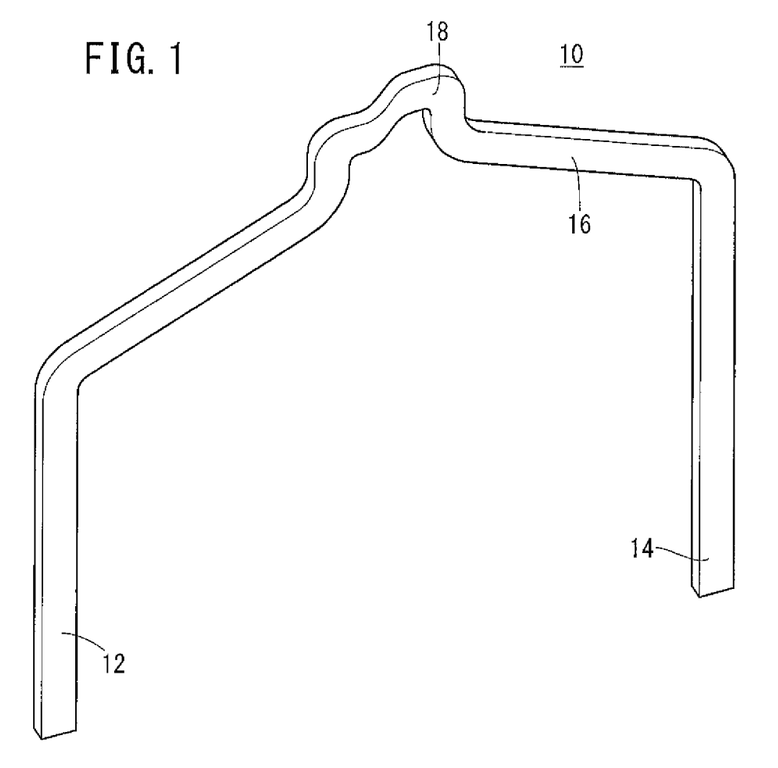
FIG. 1 is a schematic overall perspective view of a coil segment (segment) that forms an electromagnetic coil for a stator.

Initially, a stator will be described. FIG. 1 is a schematic overall perspective view showing only a segment 10 that is inserted into a stator core 20 (see FIG. 2). The segment 10 includes a first straight portion 12, a second straight portion 14 extending in parallel with respect to the first straight portion 12, and a turn portion 16 interposed between the first straight portion 12 and the second straight portion 14. The turn portion 16 is curved so as to extend from the first straight portion 12 to the second straight portion 14, and therefore, the segment 10 is substantially U-shaped.

A meandering crank portion 18 is formed on the turn portion 16. Due to such a crank portion 18, a deviation occurs in the segment 10 in a direction along the diametrical direction of the stator core.

Figure 2:
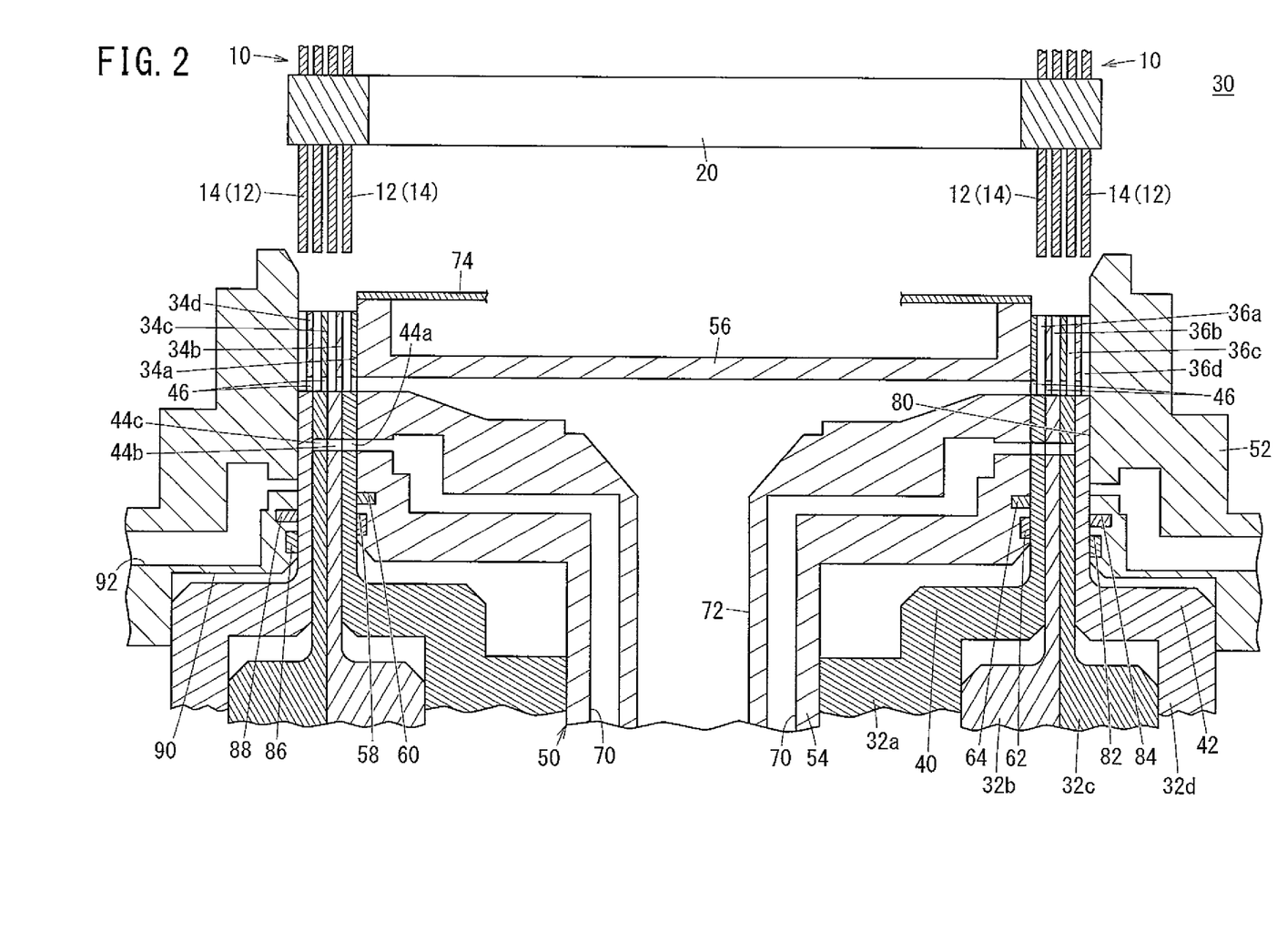
FIG. 2 is a vertical cross-sectional view of principal components of a stator manufacturing apparatus according to a first embodiment of the present invention.

With the segment 10 which is shaped in the manner described above, the first straight portion 12 is inserted into one, and the second straight portion 14 is inserted into another one of a plurality of individual slots (not shown) provided in the stator core 20 shown in FIG. 2. As a result, the segment 10 forms an electrical pathway between the two slots. More specifically, a conductive state is brought about between the slot into which the first straight portion 12 is inserted and the slot into which the second straight portion 14 is inserted. Hereinafter, if there is no particular need to distinguish between the first straight portion 12 and the second straight portion 14, they will be referred to simply as "straight portions".

Thereafter, by joining a plurality of straight portions to each other, a coil composed of a plurality of individual segments 10 is formed. As a result, the stator is constructed. A plurality of straight portions are arranged in parallel inside the slots along the diametrical direction of the stator core 20. Further, inside one of the slots, four straight portions of a first layer through a fourth layer are arranged alongside each other from an inner circumferential side to an outer circumferential side.

As shown in FIG. 2, concerning the segments 10, the first straight portions 12 and the second straight portions 14 thereof are inserted into the slots in an upright posture such that the first straight portions 12 and the second straight portions 14 face downwardly and the turn portions 16 face upwardly, and in this state, the segments 10 are twisted. Next, a stator manufacturing apparatus for twisting the segments 10 in order to obtain a stator will be described in detail.

FIG. 2 is a vertical cross-sectional view of principal components of a stator manufacturing apparatus 30 according to a first embodiment. The stator manufacturing apparatus 30 is equipped with a non-illustrated retaining jig that retains the stator core 20 in which the first straight portions 12 and the second straight portions 14 of the segments 10 are inserted into the slots. The retaining jig is capable of moving up and down under the action of a non-illustrated elevating mechanism.

The stator manufacturing apparatus 30 includes a first spindle 32a through a fourth spindle 32d in the form of twisting and bending jigs that grip the straight portions, which are inserted into the slots, and twist the segments 10. The first spindle 32a through the fourth spindle 32d are hollow bodies having substantially cylindrical shapes, and each of which receives the first straight portions 12 or the second straight portions 14 that protrude from the slots. More specifically, first receiving members 34a, which are elongated and small in diameter and extend along the axial direction of the straight portions, are provided so as to protrude toward the stator core 20 on the innermost first spindle 32a. The straight portions are inserted into first insertion recesses 36a formed in the first receiving members 34a.

Similarly, second receiving members 34b, third receiving members 34c, and fourth receiving members 34d are provided respectively in the second spindle 32b, the third spindle 32c, and the fourth spindle 32d. Further, second insertion recesses 36b, third insertion recesses 36c, and fourth insertion recesses 36d are formed in the second receiving members 34b, the third receiving members 34c, and the fourth receiving members 34d.

In the innermost first spindle 32a, downwardly of the first receiving members 34a, a flange 40 is formed that projects inwardly in the diametrical direction. The first receiving members 34a are provided on a diametrical outermost side of the flange 40. On the other hand, on the outermost fourth spindle 32d, downwardly of the fourth receiving members 34d, a flange 42 is formed that projects outwardly in the diametrical direction. The fourth receiving members 34d are provided on a diametrical innermost side of the flange 42.

In addition, the second receiving members 34b of the second spindle 32b and the third receiving members 34c of the third spindle 32c are passed through gaps defined between the first receiving members 34a and the fourth receiving members 34d. Accordingly, the first receiving members 34a (first insertion recesses 36a) through the fourth receiving members 34d (fourth insertion recesses 36d) are arranged concentrically.

A first through hole 44a, a second through hole 44b, and a third through hole 44c which extend in the diametrical direction, are formed in each of the first receiving members 34a, the second receiving members 34b, and the third receiving members 34c. The first through hole 44a, the second through hole 44b, and the third through hole 44c are connected in a straight line shape. Stated otherwise, the first through hole 44a communicates with the third through hole 44c via the second through hole 44b.

Further, in the first through fourth receiving members 34a to 34d, lateral holes 46 (communication holes) penetrating in the diametrical directions are formed respectively at positions in the vicinity of bottom portions of the first through fourth insertion recesses 36a to 36d. The interiors of the first through fourth insertion recesses 36a to 36d communicate with each other through the lateral holes 46.

Rotary drive sources such as non-illustrated servo motors or the like are attached individually to the above-constituted first through fourth spindles 32a to 32d. Therefore, the first through fourth spindles 32a to 32d are capable of rotating independently of each other.

The stator manufacturing apparatus 30 is further equipped with an inner guide 50 disposed inwardly of the first spindle 32a, and an outer guide 52 disposed outwardly of the fourth spindle 32d. The inner guide 50 includes a shaft portion 54 inserted inside the first spindle 32a, and a disk-shaped part 56, which is set to have a diameter greater than that of the shaft portion 54.

An outer diameter of the shaft portion 54 is substantially equivalent to the inner diameter of the first spindle 32a. Further, the outer diameter of the disk-shaped part 56 is substantially equivalent to the diameter of an imaginary circle formed by connecting inner walls of a plurality of the first receiving members 34a to each other. Therefore, the entirety of the inner guide 50 is accommodated inside the first spindle 32a.

A first annular groove 58 and a second annular groove 60 are formed in the side circumferential wall of the disk-shaped part 56, and a wear ring 62 and a felt ring 64 are accommodated respectively in the first annular groove 58 and the second annular groove 60. The wear ring 62 enhances the lubricity between the first receiving members 34a and the side circumferential wall of the disk shaped part 56. Further, the felt ring 64 fulfills a role of capturing foreign matter, in order to prevent such foreign matter from biting into the lower wear ring 62.

A number of first supply flow paths 70 corresponding to the number of first receiving members 34a are formed in the shaft portion 54 and the disk-shaped part 56. The respective first supply flow paths 70 branch from a non-illustrated collecting passage located downwardly of the shaft portion 54, and extend along directions of extension so as to avoid the axial center of the shaft portion 54. In addition, in the disk-shaped part 56, the first supply flow paths 70 are bent so as to extend along diametrical directions of the disk-shaped part 56, and are further bent slightly upwardly so as to bypass the wear ring 62 and the felt ring 64.

A non-illustrated compressed air supply source (fluid medium supply unit) is connected to the collecting passage, and the first supply flow paths 70 open on the side circumferential wall of the disk shaped part 56. More specifically, in the first supply flow paths 70, portions thereof downwardly of the shaft portion 54 form an upstream side in the flow direction of the compressed air (fluid medium), whereas portions thereof inside the disk-shaped part 56 form a downstream side.

The positions of the openings are above the felt ring 64. The positions of the openings correspond to the positions of the first through holes 44a formed in the first receiving members 34a.

Further, a suction flow path 72 is formed in the shaft portion 54 and the disk-shaped part 56. In the shaft portion 54, the suction flow path 72 extends along the axial center of the shaft portion 54. Since, as described above, the plurality of first supply flow paths 70 avoid the axial center, it is easy to form the suction flow path 72 and the first supply flow paths 70 separately from each other.

Although omitted from illustration, a suction unit such as a suction pump or the like is connected to the suction flow path 72 at a location below the shaft portion 54. Along with the suction unit being energized, a downwardly directed air flow is generated in the shaft portion 54. More specifically, in the suction flow path 72, a lower region of the shaft portion 54 forms a downstream side.

In the interior of the disk-shaped part 56, the suction flow path 72 branches upwardly of the first supply flow paths 70 at a number of locations corresponding to the number of first receiving members 34a. The branched suction flow paths 72 extend toward the first receiving members 34a and open at the side circumferential wall of the disk shaped part 56. The positions of the openings correspond to the positions of the lateral holes 46 formed in the first receiving members 34a.

A shutter 74, which is capable of being opened and closed, is provided in the inner guide 50. When the shutter 74 is open, the upper openings of the first through fourth insertion recesses 36a to 36d are exposed, whereas when the shutter 74 is closed, the upper openings of the first through fourth insertion recesses 36a to 36d are covered by the shutter 74.

On the other hand, the outer guide 52 is an annular body formed with an insertion hole 80 that penetrates therethrough in the vertical direction. The inner guide 50 is inserted into the insertion hole 80. The first through fourth receiving members 34a to 34d are interposed between the side circumferential wall of the disk-shaped part 56 of the inner guide 50, and the inner circumferential wall of the insertion hole 80 of the outer guide 52. A third annular groove 82 and a fourth annular groove 84 are formed in this order from below on the inner circumferential wall of the insertion hole 80. A wear ring 86 and a felt ring 88 are accommodated, respectively, in the third annular groove 82 and the fourth annular groove 84.

Further, an annular recess 90 for avoiding interference with the flange 42 of the fourth spindle 32d is formed on a lower end surface of the outer guide 52.

Second supply flow paths 92 are formed in the interior of the outer guide 52. The second supply flow paths 92 extend along a diametrical direction of the annular recess 90 in the vicinity of the annular recess 90, and thereafter, are bent slightly upward. The non-illustrated compressed air supply source (flow medium supply unit) is connected to an upstream side of the second supply flow paths 92. More specifically, compressed air is supplied individually to the first supply flow paths 70 and the second supply flow paths 92 from the same compressed air supply source.

Further, the downstream side of the second supply flow paths 92 open on the inner circumferential wall of the insertion hole 80. Consequently, the downstream side openings of the second supply flow paths 92 face toward the fourth receiving members 34d.

A non-illustrated air cylinder (raising and lowering unit) is provided on the outer guide 52. Accompanying expansion or retraction of a rod of the air cylinder, the outer guide 52 is raised or lowered relatively with respect to the inner guide 50.

The stator manufacturing apparatus 30 further includes a plurality of individual receiving jigs (none of which are shown) for receiving remaining ones of the straight portions of the segments 10 for which the one straight portions thereof have been inserted into any of the first through fourth insertion recesses 36a to 36d. More specifically, for example, when a first straight portion 12 of one of the segments 10 is inserted into a first insertion recess 36a, the second straight portion 14 thereof is inserted into the insertion recess of the receiving jig, and is not inserted into any of the second through fourth insertion recesses 36b to 36d. When the straight portions are displaced along axial directions thereof, the receiving jigs are displaced integrally with the straight portions.

The stator manufacturing apparatus 30 according to the first embodiment is constructed basically in the manner described above. Next, operations and effects of the stator manufacturing apparatus 30 will be described in relation to a method for manufacturing the stator.

To obtain the stator, initially, the first straight portion 12 and the second straight portion 14 of one individual segment 10 are inserted separately into two different ones from among a plurality of slots provided in the stator core 20. This operation is repeated until insertion of a predetermined number of segments 10 into the slots is completed. Of course, a plurality of segments may be inserted into the slots at one time.

Next, the stator core 20 is retained by the retaining jig in such a manner that the segments are held in an upright posture with the first straight portions 12 and the second straight portions 14 facing downward and the turn portions 16 facing upward. Owing thereto, the condition shown in FIG. 2 is brought about, in which rotation of the stator core 20 is stopped and positioning of the stator core 20 is fixed.

Before or after this condition, the compressed air supply source is energized. Compressed air, which is supplied to the first supply flow paths 70 of the inner guide 50, flows from inside the shaft portion 54 into the disk-shaped part 56, and continues toward the first receiving members 34a.

Figure 3:
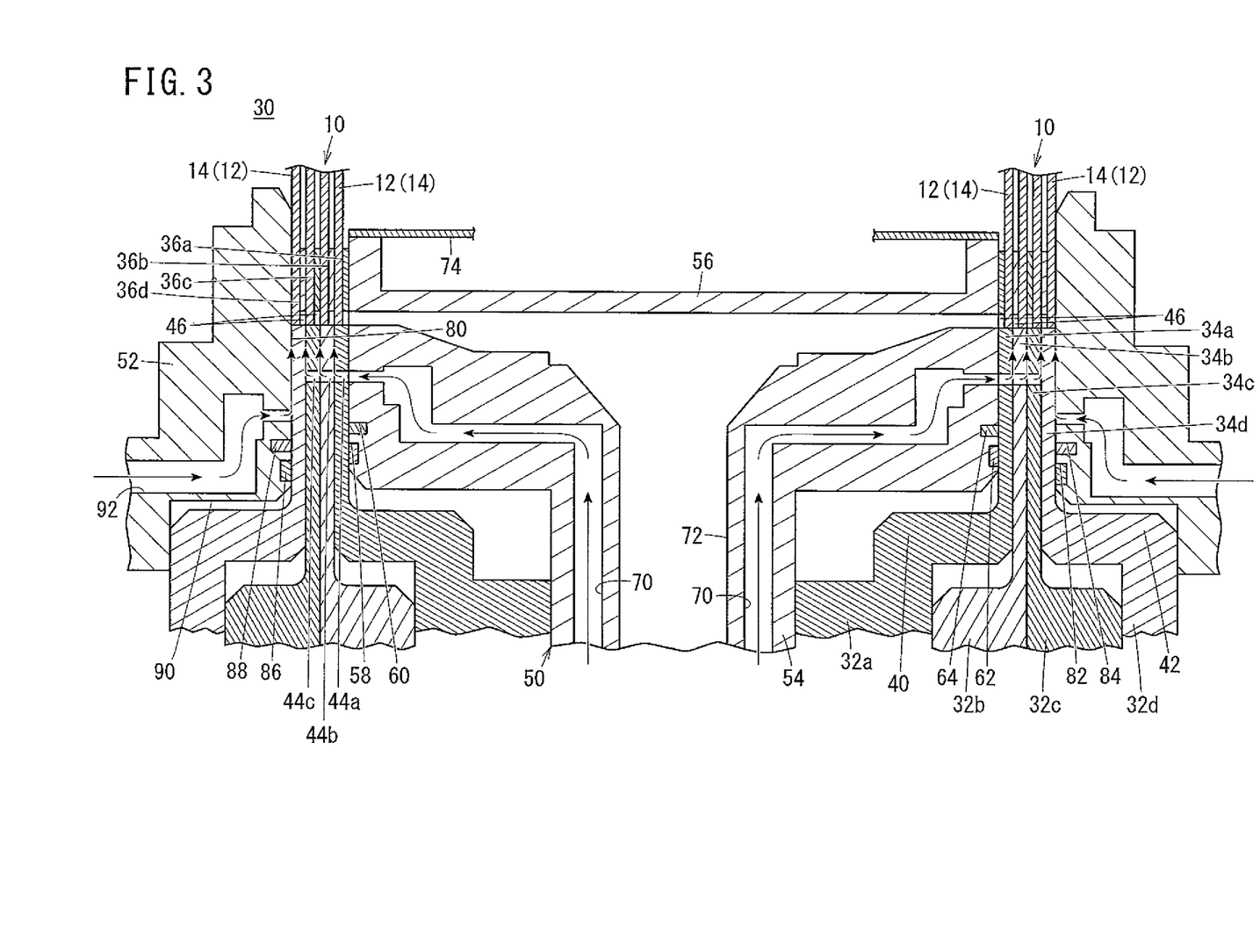
FIG. 3 is an enlarged vertical cross-sectional view of principal components of the stator manufacturing apparatus shown in FIG. 2.

At this point in time, as shown in FIGS. 2 and 3, the outer guide 52 is positioned at a descended location relative to the inner guide 50. In this case, the first supply flow paths 70 communicate with the first through holes 44a. Since the first through holes 44a communicate with the third through holes 44c via the second through holes 44b, the compressed air supplied to the first supply flow paths 70 enters the first through holes 44a and reaches the third through holes 44c.

In this instance, a slight clearance exists between the side circumferential wall of the disk-shaped part 56 and the side wall of the first spindle 32a. Accordingly, a portion of the compressed air led out from the openings of the first supply flow paths 70 enters into and wraps around such a clearance. Similarly, a portion of the compressed air led out from the outlets of the first through holes 44a on the side of the second through holes 44b enters into and wraps around a clearance between the side walls of the first spindle 32a and the second spindle 32b, and a portion of the compressed air led out from the outlets of the second through holes 44b on the side of the third through holes 44c enters into and wraps around a clearance between the side walls of the second spindle 32b and the third spindle 32c. Furthermore, the compressed air led out from the outlets of the third through holes 44c that face toward the fourth receiving members 34d enters into and wraps around a clearance between the side walls of the third spindle 32c and the fourth spindle 32d.

On the other hand, the compressed air supplied to the second supply flow paths 92 of the outer guide 52 flows toward the fourth receiving members 34d, and thereafter, passes through the openings into the insertion hole 80 of the outer guide 52, and is guided into a clearance formed between the inner circumferential wall of the insertion hole 80 of the outer guide 52 and the fourth receiving members 34d.

Next, the retaining jig is lowered relatively with respect to the first through fourth spindles 32a to 32d. Consequently, as shown in FIG. 3, certain ones of the straight portions of the plurality of segments 10 enter into any of the first through fourth insertion recesses 36a to 36d. Among the straight portions that protrude from the slots, the straight portions positioned at the innermost first layer are inserted into the first insertion recesses 36a, and the straight portions that protrude from the second layer are inserted into the second insertion recesses 36b. Similarly, the straight portions that protrude respectively from the third layer and the outermost fourth layer are inserted respectively into the third insertion recesses 36c and the fourth insertion recesses 36d. In addition, the remaining ones of the straight portions of the respective segments 10 are inserted into the insertion recesses of the aforementioned non-illustrated receiving jigs.

Upon insertion thereof, it is assumed that the lower leading edge parts of the straight portions may come into contact with upper opening edge portions of the first through fourth insertion recesses 36a to 36d, leading to the occurrence of chipping, and resulting in the generation of fragments. Even if such a situation were to occur, the compressed air supplied from the first supply flow paths 70 is led out between the side circumferential wall of the disk-shaped part 56 and the side walls of the first receiving members 34a, between the side walls of the first receiving members 34a and the second receiving members 34b, between the side walls of the second receiving members 34b and the third receiving members 34c, and between the side walls of the third receiving members 34c and the fourth receiving members 34d. In addition, the compressed air supplied from the second supply flow paths 92 is led out between the side walls of the fourth receiving members 34d and the inner circumferential wall of the insertion hole 80 of the outer guide 52. Owing to the compressed air, such fragments and foreign matter, etc., are prevented from entering into the clearances formed between the above-described members and sites.

Even if foreign matter or the like enters into the clearances, such foreign matter is caught by the felt ring 64. As a result, since such foreign matter is prevented from reaching the wear ring 62, the occurrence of foreign matter biting into the wear ring 62 can be prevented.

Although it may also be presumed that fragments may fall into any of the first through fourth insertion recesses 36a to 36d, such fragments can be removed by supplying compressed air from the second supply flow paths 92, and by way of suctioning via the suction flow path 72. Details concerning this point will be described later.

After inserting the one straight portions of the segments 10 into any of the first through fourth insertion recesses 36a to 36d, and inserting the remaining ones of the straight portions into the insertion recesses of the receiving jigs, twisting and bending of the segments 10 is carried out. More specifically, by energizing all of the servo motors, the first through fourth spindles 32a to 32d are rotated. Moreover, the directions of rotation of the first spindle 32a and the third spindle 32c, for example, are set to be opposite to the directions of rotation of the second spindle 32b and the fourth spindle 32d.

Consequently, the segments 10 in which the straight portions thereof are inserted into the innermost first layer (first insertion recesses 36a) and into the third layer from the innermost (third insertion recesses 36c), and the segments 10 in which the straight portions thereof are inserted into the second layer from the innermost (second insertion recesses 36b) and the outermost fourth layer (fourth insertion recesses 36d) are twisted in opposite directions.

The stator core 20 is gradually lowered continuously from the aforementioned state of being lowered. As a result of being lowered in this manner, and by the rotation of the first through fourth spindles 32a to 32d, the segments 10 are twisted and bent in an inclined manner.

During the process of such twisting and bending, lowering is carried out sequentially from the fourth spindle 32d on the outer circumferential side to the second spindle 32b, and after lowering thereof, rotation of the fourth spindle 32d, the third spindle 32c, and the second spindle 32b, which have been lowered, may be stopped. In this case, since twisting and bending of only the segments 10 on the inner circumferential side is carried out, it is possible to avoid a situation that the amount at which the straight portions protrude becomes smaller than that on the inner circumferential side. Moreover, for this reason, the second spindle 32b, the third spindle 32c, and the fourth spindle 32d may each be provided respectively with elevating mechanisms, which are capable of separately raising and lowering the second spindle 32b, the third spindle 32c, and the fourth spindle 32d.

Figure 4:
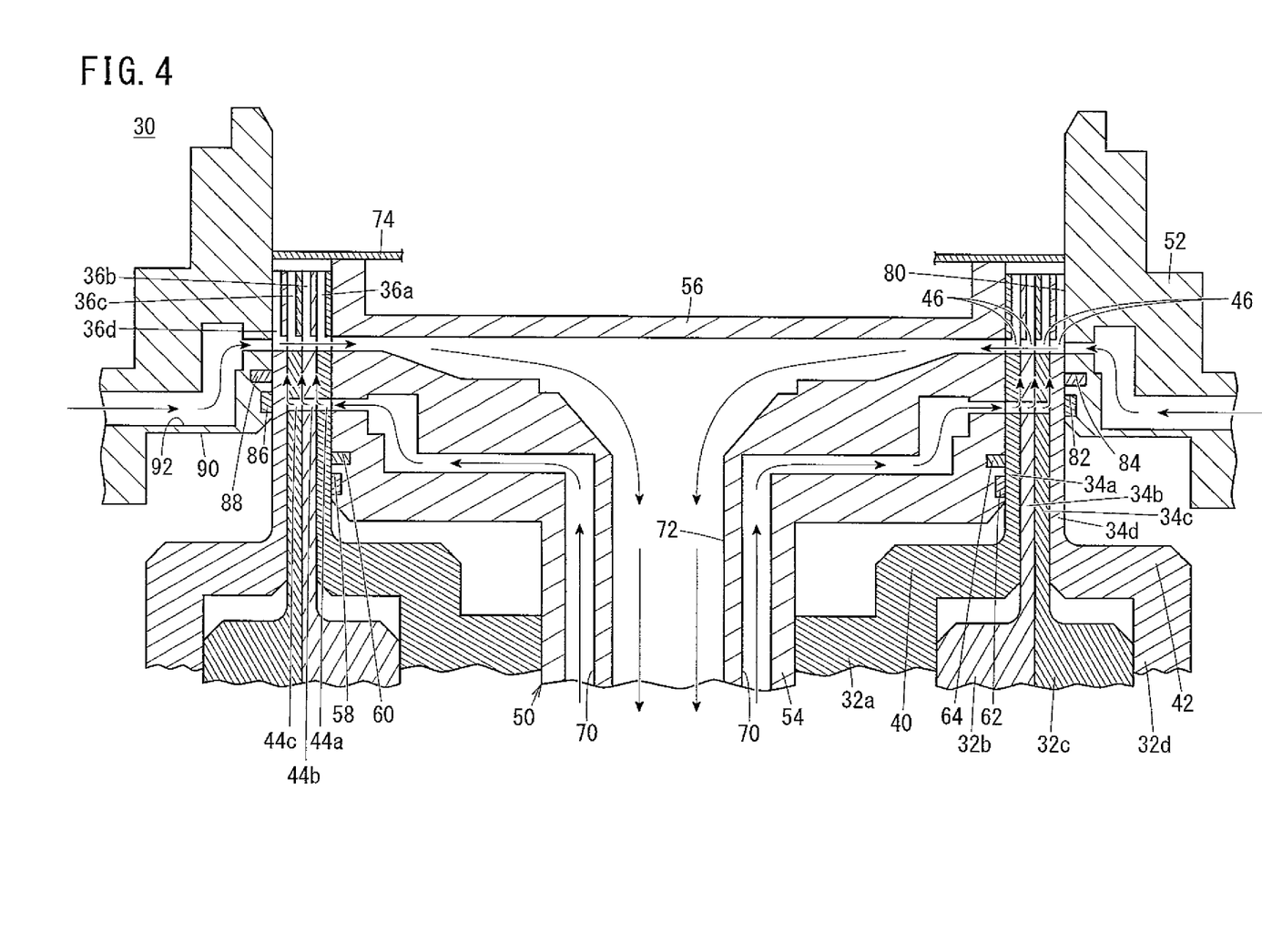
FIG. 4 is an enlarged vertical cross-sectional view showing a state in which an outer guide that makes up the stator manufacturing apparatus of FIG. 2 is elevated relatively with respect to an inner guide, together with a shutter covering first through fourth insertion recesses.

As a result of the above-described twisting and bending, all of the ends of the respective segments 10 are twisted and bent. Thereafter, the retaining jigs and the stator core 20 are raised relatively with respect to the first through fourth spindles 32a to 32d, and along therewith, as shown in FIG. 4, the straight portions are separated away from the first through fourth insertion recesses 36a. to 36d. Thereafter, the straight portions, which are exposed from the slots, are joined to each other, whereby an electrical pathway is formed between the segments 10. Consequently, a stator is obtained in which the connected segments 10 thereof make up an electromagnetic coil.

On the other hand, the shutter 74 disposed on the inner guide 50 is closed. As a result, the upper openings of the first through fourth insertion recesses 36*a* to 36*d* are covered.

On the other hand, the air cylinder is energized, and the rod thereof is retracted. Consequently, the outer guide 52 is raised relatively with respect to the inner guide 50, and the positions of the openings of the second supply flow paths 92 are made to coincide with the positions of the lateral holes 46 formed in the fourth receiving members 34*d*. During rising thereof, supply of compressed air from the second supply flow paths 92 may be stopped.

Next, together with supplying compressed air to the lateral holes 46 from the second supply flow paths 92, the suction unit (a suction pump or the like) is energized. Since the openings of the suction flow paths 72 open in directions facing toward the lateral holes 46 of the fourth receiving members 34*d*, and the interiors of the first through fourth insertion recesses 36*a* to 36*d* communicate with each other via the lateral holes 46, compressed air is supplied simultaneously from the lateral holes 46 of the outermost fourth receiving members 34*d* to the interiors of the first through fourth insertion recesses 36*a* to 36*d*, and together therewith, suctioning is carried out simultaneously through the lateral holes 46 of the innermost first receiving members 34*a* with respect to the interiors of the first through fourth insertion recesses 36*a* to 36*d*.

At this time, since the shutter 74 is covering the upper openings of the first through fourth insertion recesses 36*a* to 36*d*, suctioning of atmospheric air from the upper openings of the first through fourth insertion recesses 36*a* to 36*d* is avoided. Therefore, the interiors of the first through fourth insertion recesses 36*a* to 36*d* are suctioned efficiently.

Together with compressed air being supplied in this manner, suctioning is carried out from positions face-to-face with the positions at which the compressed air is supplied, whereby an air current, which flows from the positions at which the compressed air is supplied to the positions where suctioning is performed, is generated inside the first through fourth insertion recesses 36*a* to 36*d*. In the case that fragments fall into the first through fourth insertion recesses 36*a* to 36*d*, both a pressing force by the compressed air and a pulling force due to the suctioning act on the fragments. Thus, the fragments become entrained in the air current. More specifically, the fragments move through the lateral holes 46 to the side of the suction flow path 72, and further enter into the suction flow path 72. Owing to the above actions, the fragments are discharged from the first through fourth insertion recesses 36*a* to 36*d*.

Even when twisting and bending of segments 10 that are inserted into the slots of another stator core 20 is carried out, the same operations as described above are implemented. At this time, since any fragments have already been removed from within the first through fourth insertion recesses 36*a* to 36*d*, the adherence of such fragments to the straight portions is avoided. Consequently, in the segments 10, formation of unnecessary electrical pathways caused by such fragments can be avoided.

Figure 5:
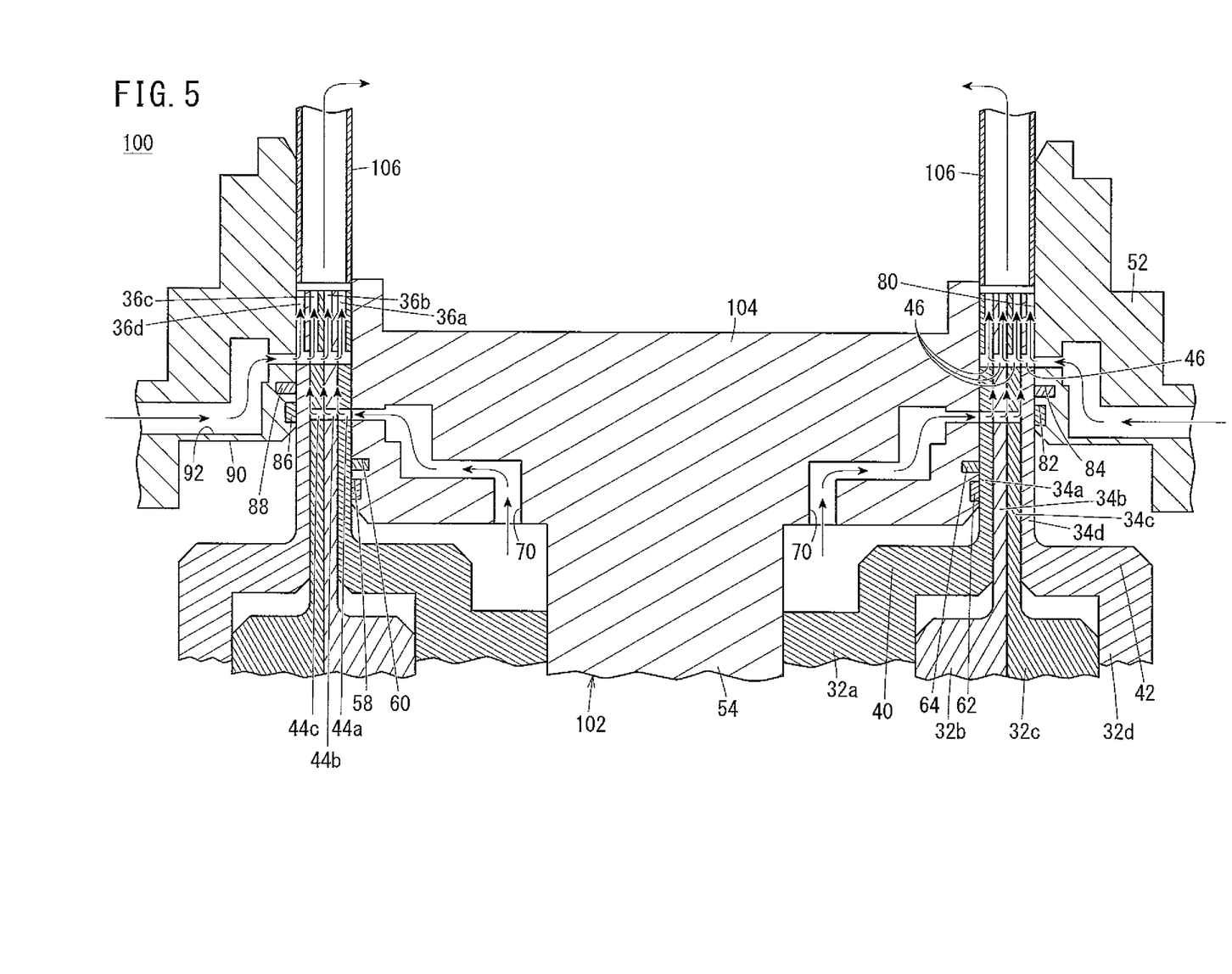
FIG. 5 is a vertical cross-sectional view of principal components of a stator manufacturing apparatus according to a second embodiment of the present invention.

Next, with reference to FIG. 5, a stator manufacturing apparatus 100 according to a second embodiment will be described. Basically, constituent elements of the second embodiment that correspond to the constituent elements shown in FIGS. 1 to 4 are represented by the same names.

In this case, only the first supply flow paths 70 are formed in the interior of the inner guide 102. Moreover, in this case., supply of compressed air to the first supply flow paths 70 is carried out through a space defined between a disk-shaped part 104 of the inner guide 102 and the flange 40 of the first spindle 32*a*.

Further, only the second supply flow paths 92 are formed in the outer guide 52. Furthermore, the stator manufacturing apparatus 100 includes suction pipes 106 connected to a suction unit (a suction pump or the like). Flexible tubes, not shown, are connected between the suction pipes 106 and the suction pump. Therefore, it is possible to move the suction pipes 106 to any arbitrary location.

In the stator manufacturing apparatus 100, during twisting and bending of the segments 10, similarly to the first embodiment, compressed air is supplied from the first supply flow paths 70 in the inner guide 102, and the second supply flow paths 92 of the outer guide 52. Consequently, it is possible to prevent foreign matter and fragments from biting at the previously mentioned locations.

Further, after twisting and bending of the segments 10 is completed and the straight portions have been separated away from the first through fourth insertion recesses 36*a* to 36*d*, the outer guide 52 is raised relatively with respect to the inner guide 102, and the positions of the openings of the second supply flow paths 92 are made to coincide with the positions of the lateral holes 46 of the fourth receiving members 34*d*. On the other hand, the suction pipes 106 are arranged in covering relation to the upper openings of the first through fourth insertion recesses 36*a* to 36*d*.

In this state, compressed air is supplied into the first through fourth insertion recesses 36*a* to 36*d* via the second supply flow paths 92, and the interiors of the first through fourth insertion recesses 36*a* to 36*d* are suctioned through the suction pipes 106. In the case that foreign matter falls into the first through fourth insertion recesses 36*a* to 36*d*, both a pressing force by the compressed air and a pulling force due to the suctioning act on the foreign matter. Consequently, the foreign matter is easily suctioned and discharged from inside the first through fourth insertion recesses 36*a* to 36*d*.

Therefore, according to the second embodiment as well, during the next twisting and bending operation, the adherence of fragments to the straight portions of the segments 10 is avoided. This is because, as noted above, such fragments have already been removed from the first through fourth insertion recesses 36*a* to 36*d*. More specifically, in this case as well, formation of unnecessary electrical pathways in the segments 10 caused by such fragments can be avoided.

The present invention is not limited in particular to the first embodiment and the second embodiment described above, and various modifications can be made thereto without departing from the scope of the present invention as set forth in the appended claims.

For example, the suction flow path 72 may be formed in the outer guide 52.

What is claimed is:

1. A stator manufacturing method for obtaining a stator by twisting and bending coil segments in which first straight portions and second straight portions of the coil segments are inserted into slots formed along a circumferential direction of a stator core, comprising the steps of:

inserting ends of the first straight portions or the second straight portions that are exposed from the slots of the stator core into insertion recesses formed respectively in a plurality of twisting and bending jigs, and thereafter, twisting and bending the coil segments by rotating the twisting and bending jigs; and separating the ends of the first straight portions or the second straight portions away from the insertion recesses, and thereafter, simultaneously suctioning interiors of all of the insertion recesses through a flow path directly inwardly from an outermost recess of the insertion recesses formed in an outermost twisting and bending jig of the twisting and bending jigs toward an innermost recess of the insertion recesses formed in an innermost twisting and bending jig of the twisting and bending jigs.

2. The stator manufacturing method according to claim 1, wherein when the interiors of the insertion recesses are suctioned, a fluid medium is supplied to the insertion recesses from a direction that differs from a direction in which suctioning is performed.

3. The stator manufacturing method according to claim 1, wherein when the coil segments are twisted and bent, a fluid medium is supplied between adjacent ones of the twisting and bending jigs.

4. The stator manufacturing method according to claim 1, wherein when the coil segments are twisted and bent, the insertion recesses are covered by a shutter.

5. A stator manufacturing apparatus configured to obtain a stator by twisting and bending coil segments in which first straight portions and second straight portions of the coil segments are inserted into slots formed along a circumferential direction of a stator core, comprising:
   a plurality of twisting and bending jigs configured to be rotated, and the twisting and bending jigs having receiving members in which insertion recesses are formed, ends of the first straight portions or the second straight portions that are exposed from the slots of the stator are inserted into the insertion recesses; and
   a suction unit configured to suction interiors of the insertion recesses;
   wherein the receiving members of the twisting and bending jigs are arranged concentrically, and the suction unit is configured to simultaneously suction the interiors of all of the insertion recesses along a flow path directed inwardly from an outermost recess of the insertion recesses formed in an outermost twisting and bending jig of the twisting and bending jigs toward an innermost recess of the insertion recesses formed in an innermost twisting and bending jig of the twisting and bending jigs.

6. The stator manufacturing apparatus according to claim 5, further comprising an inner guide arranged inwardly of the innermost twisting and bending jig of the twisting and bending jigs, and an outer guide arranged outwardly of the outermost twisting and bending jig of the twisting and bending jigs;
   wherein a suction flow path is formed in either one of the inner guide and the outer guide; and
   communication holes are formed on respective side walls of the receiving members and configured to allow the insertion recesses to communicate with the suction flow path.

7. The stator manufacturing apparatus according to claim 6, wherein a supply flow path configured to communicate with the insertion recesses is formed in either one of the inner guide and the outer guide; and
   further comprising a fluid medium supply unit configured to supply a fluid medium to the insertion recesses via the supply flow path from a direction that differs from a direction in which suctioning is performed.

8. The stator manufacturing apparatus according to claim 5, wherein through holes through which a fluid medium is supplied between adjacent ones of the twisting and bending jigs are formed in the receiving members.

9. The stator manufacturing apparatus according to claim 8, wherein a raising and lowering unit configured to raise or lower the outer guide relatively with respect to the inner guide is provided on the outer guide or the inner guide.

10. The stator manufacturing apparatus according to claim 5, further comprising a shutter configured to cover the insertion recesses.

* * * * *

UNITED STATES PATENT AND TRADEMARK OFFICE
CERTIFICATE OF CORRECTION

PATENT NO. : 10,673,310 B2  
APPLICATION NO. : 15/656157  
DATED : June 2, 2020  
INVENTOR(S) : Takashi Yoshida et al.

Page 1 of 1

It is certified that error appears in the above-identified patent and that said Letters Patent is hereby corrected as shown below:

In the Claims

Claim 1, Column 13, Lines 4-5, delete the recitation "formed in an outermost twisting and bending jig of the twisting and bending jigs".

Claim 1, Column 13, Line 6, insert before the word "formed" the recitation --, the outermost recess being formed in an outermost twisting and bending jig of the twisting and bending jigs, and the innermost recess being--.

Claim 5, Column 14, Lines 1-2, delete the recitation "formed in an outermost twisting and bending jig of the twisting and bending jigs".

Claim 5, Column 14, Line 3, insert before the word "formed" the recitation --, the outermost recess being formed in an outermost twisting and bending jig of the twisting and bending jigs, and the innermost recess being--.

Signed and Sealed this  
Fourth Day of August, 2020

Andrei Iancu  
*Director of the United States Patent and Trademark Office*